US011051653B2

(12) United States Patent
Kelly (10) Patent No.: US 11,051,653 B2
(45) Date of Patent: Jul. 6, 2021

(54) GRILL SYSTEM AND METHOD FOR DETECTING MOVEMENT WHEN MOTOR IS "OFF"

(71) Applicant: TAYLOR COMMERCIAL FOODSERVICE, LLC, Rockton, IL (US)

(72) Inventor: Daniel L. Kelly, Ft. Wayne, IN (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 285 days.

(21) Appl. No.: 16/082,800

(22) PCT Filed: Mar. 7, 2017

(86) PCT No.: PCT/US2017/021065
§ 371 (c)(1),
(2) Date: Sep. 6, 2018

(87) PCT Pub. No.: WO2017/155930
PCT Pub. Date: Sep. 14, 2017

(65) Prior Publication Data
US 2019/0075966 A1 Mar. 14, 2019

Related U.S. Application Data

(60) Provisional application No. 62/306,664, filed on Mar. 11, 2016.

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC ............ A47J 2037/0617; A47J 37/0611; A47J 27/62; A23L 5/15
(Continued)

(56) References Cited

U.S. PATENT DOCUMENTS 3,776,124 A * 12/1973 Morley ................ A47J 37/0611
99/335
4,586,428 A * 5/1986 Adamson ............. A47J 37/0611
99/332
(Continued)

FOREIGN PATENT DOCUMENTS

CN 201398884 2/2010
CN 101986553 3/2011
(Continued)

OTHER PUBLICATIONS

International Preliminary Report on Patentability and Written Opinion for PCT/US2017/021065, dated Sep. 11, 2018, 7 pp.
(Continued)

*Primary Examiner* — Tu B Hoang
*Assistant Examiner* — Vy T Nguyen
(74) *Attorney, Agent, or Firm* — Barnes & Thornburg LLP (57) ABSTRACT

A grill including a first platen assembly, an second platen assembly movable with respect to the first platen assembly, a motor operable to move the second platen assembly with respect to the first platen assembly, and a control operable to measure movement of the second platen assembly with respect to the first platen assembly while the motor is off.

8 Claims, 7 Drawing Sheets

(58) Field of Classification Search
USPC .............. 99/349, 325, 372, 375; 426/523; 219/524
See application file for complete search history.

(56) References Cited

U.S. PATENT DOCUMENTS

| | | | |
|---|---|---|---|
| 4,913,040 A * | 4/1990 | Sherman | A47J 37/0611 99/349 |
| 5,791,234 A | 8/1998 | Newton | |
| 5,847,365 A * | 12/1998 | Harter | A47J 37/0611 219/492 |
| 5,910,207 A | 6/1999 | Newton et al. | |
| 6,016,743 A | 1/2000 | Glavan | |
| 6,614,007 B1 * | 9/2003 | Reay | A47J 37/0676 219/460.1 |
| 7,448,373 B2 | 11/2008 | Hill | |
| 7,472,645 B2 | 1/2009 | Hill | |
| 8,154,228 B2 | 4/2012 | Yundt et al. | |
| 9,260,260 B2 | 2/2016 | Park et al. | |
| 9,861,230 B2 | 1/2018 | Freymiller | |
| 9,927,382 B2 | 3/2018 | Freymiller | |
| 10,010,218 B2 | 7/2018 | Sands | |
| 10,098,499 B2 | 10/2018 | Nelson | |
| 10,117,545 B2 | 11/2018 | Nelson | |
| 10,159,379 B2 | 12/2018 | Nelson | |
| 10,213,050 B2 | 2/2019 | Freymiller | |
| 2006/0254430 A1 * | 11/2006 | Nevarez | A47J 37/0611 99/349 |
| 2007/0254078 A1 * | 11/2007 | Calzada | A47J 37/0611 426/523 |
| 2008/0048601 A1 * | 2/2008 | Gregori | H02H 7/0851 318/461 |
| 2011/0203461 A1 | 8/2011 | Nevarez et al. | |
| 2013/0071534 A1 | 3/2013 | Newton | |
| 2014/0026764 A1 * | 1/2014 | Sykes | A47J 37/06 99/349 |
| 2014/0161953 A1 * | 6/2014 | Jones | A47J 37/0786 426/523 |
| 2015/0108110 A1 | 4/2015 | Freymiller | |
| 2015/0305557 A1 * | 10/2015 | Nelson | A47J 37/0611 99/375 |
| 2016/0037967 A1 | 2/2016 | Glavan | |
| 2016/0045066 A1 | 2/2016 | Sands | |
| 2016/0049854 A1 | 2/2016 | Ny | |
| 2016/0309941 A1 | 10/2016 | Minard | |
| 2018/0360269 A1 | 12/2018 | Sands | |
| 2019/0038073 A1 | 2/2019 | Nelson | |
| 2019/0045972 A1 | 2/2019 | Freymiller | |
| 2019/0059643 A1 | 2/2019 | Minard | |
| 2019/0075966 A1 | 3/2019 | Kelly | |
| 2019/0104885 A1 | 4/2019 | Pahnke | |
| 2019/0117019 A1 | 5/2019 | Minard | |

FOREIGN PATENT DOCUMENTS

| | | |
|---|---|---|
| CN | 102460952 | 5/2012 |
| CN | 104811572 | 7/2015 |
| WO | WO 97/46150 | 12/1997 |
| WO | WO 2007/149063 A2 | 12/2007 |
| WO | 2014/144248 | 9/2014 |

OTHER PUBLICATIONS

Examination Report issued in Appl. No. CA 3,016,669 (dated Jun. 28, 2019).

Notice of Allowance issued in Appl. No. CA 3,016,669 (dated Jul. 6, 2020).

Office Action issued in Appl. No. CN 201780016585.8 (dated Sep. 30, 2020).

* cited by examiner

GRILL SYSTEM AND METHOD FOR DETECTING MOVEMENT WHEN MOTOR IS "OFF"

CROSS-REFERENCE TO RELATED APPLICATIONS

This application claims priority from PCT Application No. PCT/US2017/021065, filed on Mar. 7, 2017, which claims priority from U.S. Provisional Patent Application No. 62/306,664, filed on Mar. 11, 2016, the entirety of which are each fully incorporated by reference herein.

BACKGROUND

The present disclosure relates to a grill and, more particularly, to system for detecting a position thereof.

Grills or griddles are used to cook various foods, such as hamburgers for example. A conventional clamshell grill generally includes a second platen assembly movably connected to a first platen assembly. For example, the second platen assembly may be pivotally coupled to the first platen assembly for movement between a lower cooking position overlying the first platen assembly and a raised position inclined upwardly from the first platen assembly. When the second platen assembly is in the lowered cooking position, a gap is created between the upper and lower platen assemblies. This gap is generally adjustable according to the thickness of the food being cooked. For example, hamburger patties are preformed in several different sizes (i.e. a quarter pound patty has a greater thickness than a regular patty). To cook the food, an operator selects the gap size and a cooking time via an operator interface for the food item being cooked.

A sensor may be utilized to identify when the upper platen is closed so a solenoid latch may be engaged. This is past a resting "closed" position so the latch doesn't inhibit closing of the platen. After the solenoid latch is energized, the motor is turned "off" to allow the upper platen to rise against the latch under a spring bias. The sensor usually shows an open state at this point as if the hall effect sensor was adjusted to show a "closed" state when the solenoid is engaged, it would engage too soon and the latch would prevent full closing of the upper platen.

SUMMARY

A grill according to one disclosed non-limiting embodiment of the present disclosure can include a first platen assembly; a second platen assembly movable with respect to the first platen assembly; a motor operable to move the second platen assembly with respect to the first platen assembly; and a control operable to measure movement of the second platen assembly with respect to the first platen assembly while the motor is off.

A further embodiment of the present disclosure may include a latch mechanism configured to selectively couple the second platen assembly with respect to the first platen assembly.

A further embodiment of the present disclosure may include a spring mechanism operable to bias the second platen assembly toward the open position.

A further embodiment of the present disclosure may include, wherein the control is operable to intermittently short a motor coil of the motor so that back EMF causes current to flow in the motor coil in response to mechanical movement of the upper platen assembly.

A further embodiment of the present disclosure may include measuring the current to identify a relatively position of the upper platen assembly.

A further embodiment of the present disclosure may include measuring the current to identify a latch failure.

A further embodiment of the present disclosure may include measuring the current to identify an over travel adjustment.

A further embodiment of the present disclosure may include measuring the current to measure a position of the upper platen assembly.

A method of detecting movement of a grill platen while a motor is off, the method according to one disclosed non-limiting embodiment of the present disclosure can include shorting a motor coil of a motor operable to move an second platen assembly with respect to a first platen assembly so that back EMF causes current to flow in the motor coil in response to mechanical movement of the upper platen assembly; and measuring the current to identify a relatively position of the upper platen assembly.

A further embodiment of the present disclosure may include, wherein identifying a relatively position of the second platen assembly includes identifying a latch failure.

A further embodiment of the present disclosure may include, wherein identifying a relatively position of the second platen assembly includes identifying an over travel adjustment.

A further embodiment of the present disclosure may include wherein identifying a relatively position of the second platen assembly includes measuring movement of the upper platen assembly.

A further embodiment of the present disclosure may include, wherein identifying a relatively position of the second platen assembly occurs while a spring mechanism is biasing the upper platen assembly.

A further embodiment of the present disclosure may include wherein identifying a relatively position of the second platen assembly occurs whenever the second platen assembly is not moving.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
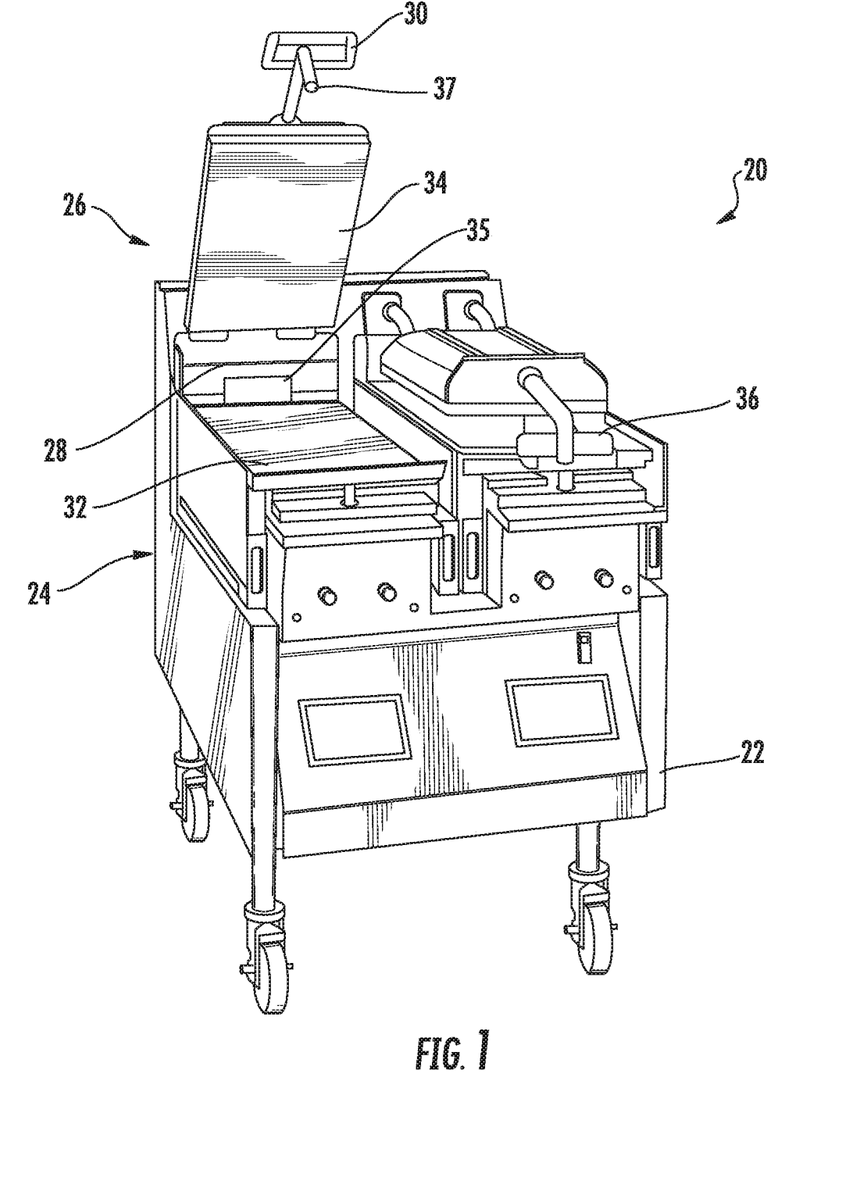
FIG. 1 is a perspective view of an example grill system according to one disclosed non-limiting embodiment.

FIG. 1 schematically illustrates a grill system 20. The grill 20 includes a rigid base structure 22 to support a first platen assembly 24 and a second platen assembly 26. The second platen assembly 26 may be movably attached to the base structure 22 with a mounting structure 28 such that the second platen assembly 26 is configured to move between a lowered, cooking position and an upper raised position relative to the first platen assembly 24. It should be appreciated that although a particular relationship of the upper and lower platen assembly are disclosed, either the first and/or second platen assembly may be movable.

In one embodiment, the mounting structure 28 is a hinge 43 such that the second platen assembly 26 is configured to pivot relative to the first platen assembly 24; however, in other embodiments, the second platen assembly 26 may be lowered and raised in a generally linear motion. The second platen assembly 26 may be moved between the raised and lowered positions either automatically or manually. In embodiments where the second platen assembly 26 is moved manually, the second platen assembly 26 may include a handle 30 that can be grabbed by an operator to move the second platen assembly 26 between the raised and lowered positions.

The first platen assembly 24 includes a lower grilling plate 32 and the second platen assembly 26 includes an upper grilling plate 34. Food items are placed on the lower grilling plate 32 by the operator for cooking. A motor 35 (illustrated schematically) is operable to move the second platen assembly 26 between the opened and the lowered position such that the one or more food items to be cooked are positioned within a gap 36 formed between the upper and lower grilling plates 32, 34, then latched with a latch 37 such as via the handle 30.

The grilling plates 32, 34 are heated by a heater (not shown) to cook the food items. In order to transmit heat to the food item the grilling plates 32, 34, respectively, may be formed of a heat-conducting material, such as cast aluminum, abrasion resistant steel, cast iron, stainless steel, mild steel, a ceramic material, or other suitable heat conducting materials used in grills. Although the grilling plates 32, 34 are shown as having a rectangular shape, one or both of the grilling plates 32, 34 may also be formed into other shapes, such as circular or oval shapes for example. Although a single grill is described in detail, a plurality of individual grills 20 may be arranged adjacent one another to form a grill assembly.

Figure 2:
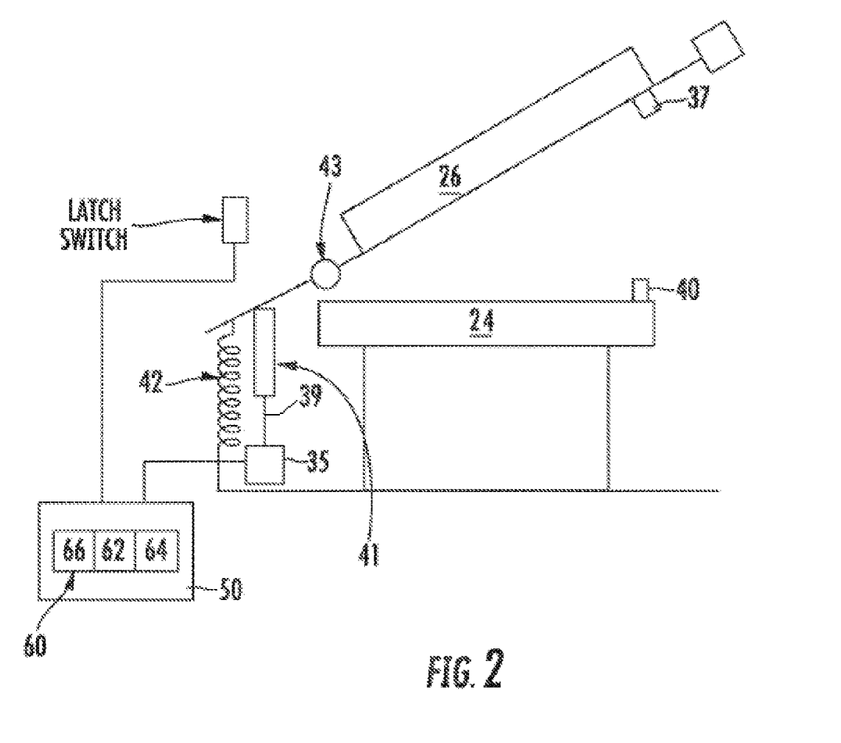
FIG. 2 is a schematic view of a motor for the grill system.

With reference to FIG. 2, the motor 35 is operable in response to a control system 50 to move the second platen assembly 26. The motor movement for a close cycle may include an acceleration phase, a steady run rate phase, and a deceleration phase. In one embodiment, the motor 35 turns a lead screw in a linear actuator 41 such that there is 0.500 inches travel per shaft revolution with about 5 inches total travel to raise or lower the second platen assembly 26.

While closing the second platen assembly 26, deceleration must begin at a particular point in the close cycle to bring the second platen assembly 26 to a smooth stop. If the operator has manually moved the platen prior to motor driven closing, the control system needs to track this movement so the point to begin deceleration point can be recalculated. Subsequent to closing the platen, a latch solenoid 40 is actuated to latch the second platen assembly 26 to the first platen assembly 24. In one embodiment, the latch solenoid 40 is stationary on the bottom and the latch 37 slides over it. When the solenoid 40 is energized, the two balls on the side of the solenoid 40 protrude to engage the latch 37.

The motor 35 is then deactivated to allow a spring mechanism 42 to slightly open the second platen assembly 26 and be retained against the latch 37. That is, once the motor 35 is deactivated the spring mechanism 42 operates to push the second platen assembly 26 toward the open position until retained by the latch 37. If the latch solenoid 40 fails to engage the latch 37, the spring mechanism 42 will raise the second platen assembly 26 to full open position. Tracking motor movement while off allows detection of latch failure. These and other situations make it desirable to detect movement of the platen while the motor is deactivated.

The control system 50 can include a control module 60 with a processor 62, a memory 64, and an interface 66. The processor 62 can include any type of microprocessor or other processing device having desired performance characteristics. The memory 64 may include any type of computer readable medium that stores the data and control processes disclosed herein. That is, the memory 64 is an example computer storage media that can have embodied thereon computer-useable instructions such as a process that, when executed, can perform a desired method. The interface 66 of the control module 60 can facilitate communication between the control module 60 and other systems.

Figure 3:
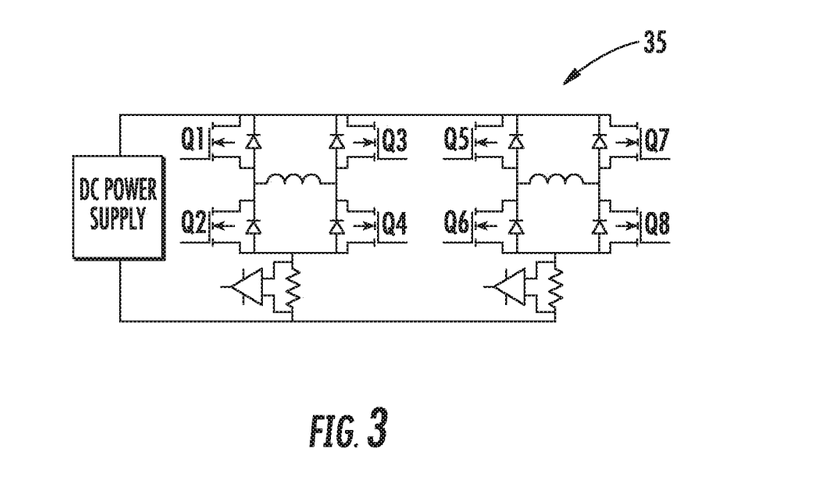
FIG. 3 is a schematic view of a motor for the grill system.
Figure 4:
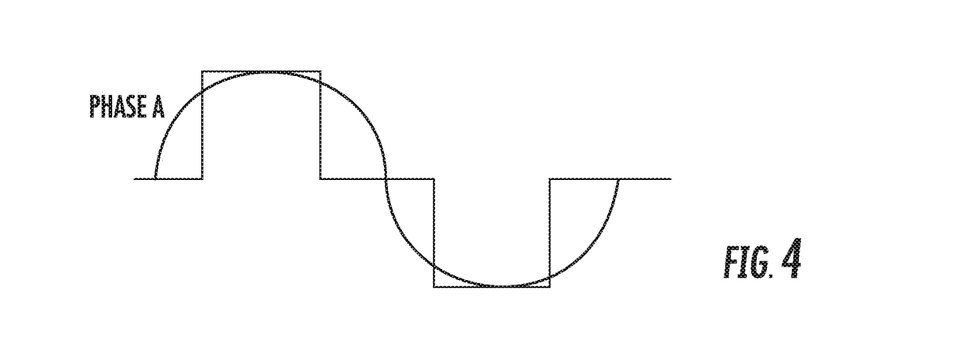
FIGS. 4 and 5 are phase diagrams of the motor.
Figure 5:
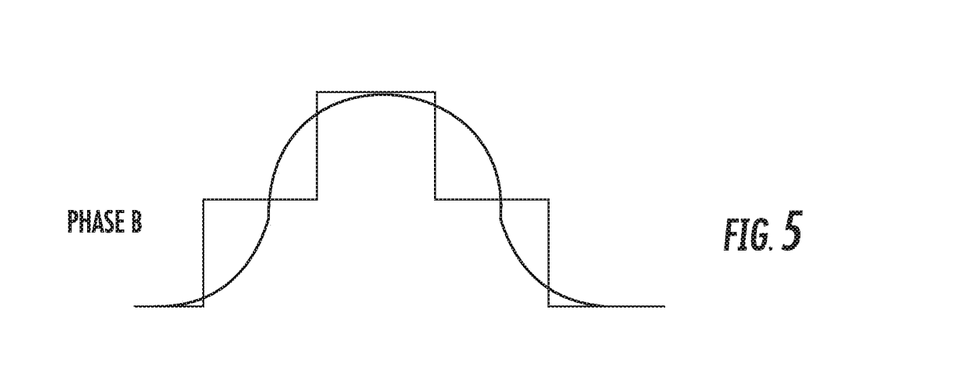

With reference to FIG. 3, according to one embodiment, the motor 35 may be a 2 phase bi-polar stepper motor design. Each coil is driven through a full-bridge (Q1-Q4) and (Q5-Q8) to allow the polarity of applied voltage to be varied. Transistors Q1 and Q4 are turned on while Q2 and Q3 are off to apply positive voltage to motor coil A. Transistors Q2 and Q3 are turned on while Q1 and Q4 are off to apply negative voltage to coil A. Q5-Q8 perform similar role for coil B. While each coil is actively driven, coil current flows through shunt resistors R1 or R2. The voltage across these shunt resistors is proportional to the current in the motor coil. The coils are pulse-width modulation (PWM) duty cycled and the current in each coil is measured each PWM cycle. The PWM duty cycle is adjusted, cycle by cycle, to maintain the desired current level. In this example, the motor has 200 steps per revolution. Each full step may be split into ¼ a sine period to allow the drive to be "microstepped" to produce smoother movement. (FIGS. 4 and 5).

The motor 35 generates voltage when the motor shaft 39 rotates. The EMF generated by the motor provides a mechanism to detect and track manual movement of the upper platen while the motor is "off". The hardware need not sense this voltage directly as the coils may be momentarily shorted so the generated voltage causes current to flow in the motor coils. The control measures the resulting current to detect motor movement. The motor coils can be shorted by turning on transistors Q2 and Q4 for Coil "A", and transistors Q6 and Q8 for coil "B".

This current operates to resist mechanical movement. This provides significant resistance to moving the shaft 39 such that the faster the movement, the larger the dampening force. The length of time the coils are shorted may be varied so that current flowing in the coils is reduced and mechanical loading is negligible. This allows movement to be measured over a relatively large speed range.

To further avoid such significant resistance to movement, only one coil is shorted at a time, and for only long enough to develop measurable current from the EMF. The amount of time the coil is shorted is controlled in time proportionally to the detected speed of the motor. Coil current flows in the shunt resistors (R1 and R2) only while the coils are being actively driven. Since driving the coil causes current to flow in the coil, the drive pulse to measure current is only 1.5 uS wide so that coil inductance prevents significant current flow during measurement. The drive polarities can also be alternated so this slight bias current does not bias the overall movement detection.

The sensed current produces a signed value that provides magnitude as well as polarity. When magnitude is above a threshold, the motor coil quadrant is known. By comparing changes in quadrants of the two coils, the speed and distance of motion can be determined. The speed is not otherwise required other than to adjust the time to short the coils. Counting movement may be performed to determine shaft position.

Figure 6:
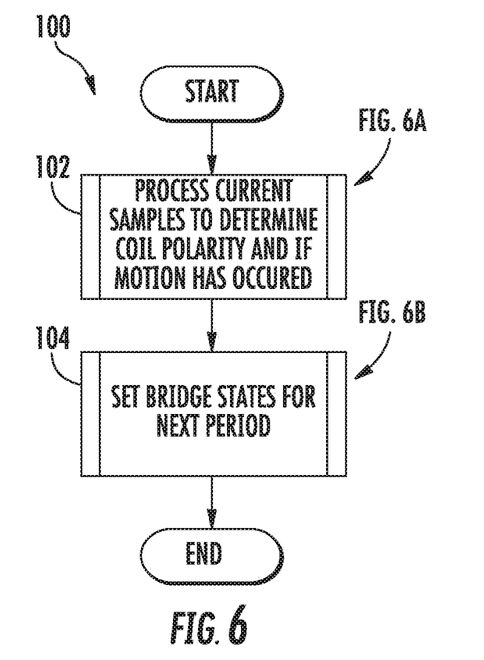
FIGS. 6, 6A, 6B are block diagrams of a method of detecting movement of a grill platen while a motor is off according to another disclosed non-limiting embodiment.
Figure 6A:
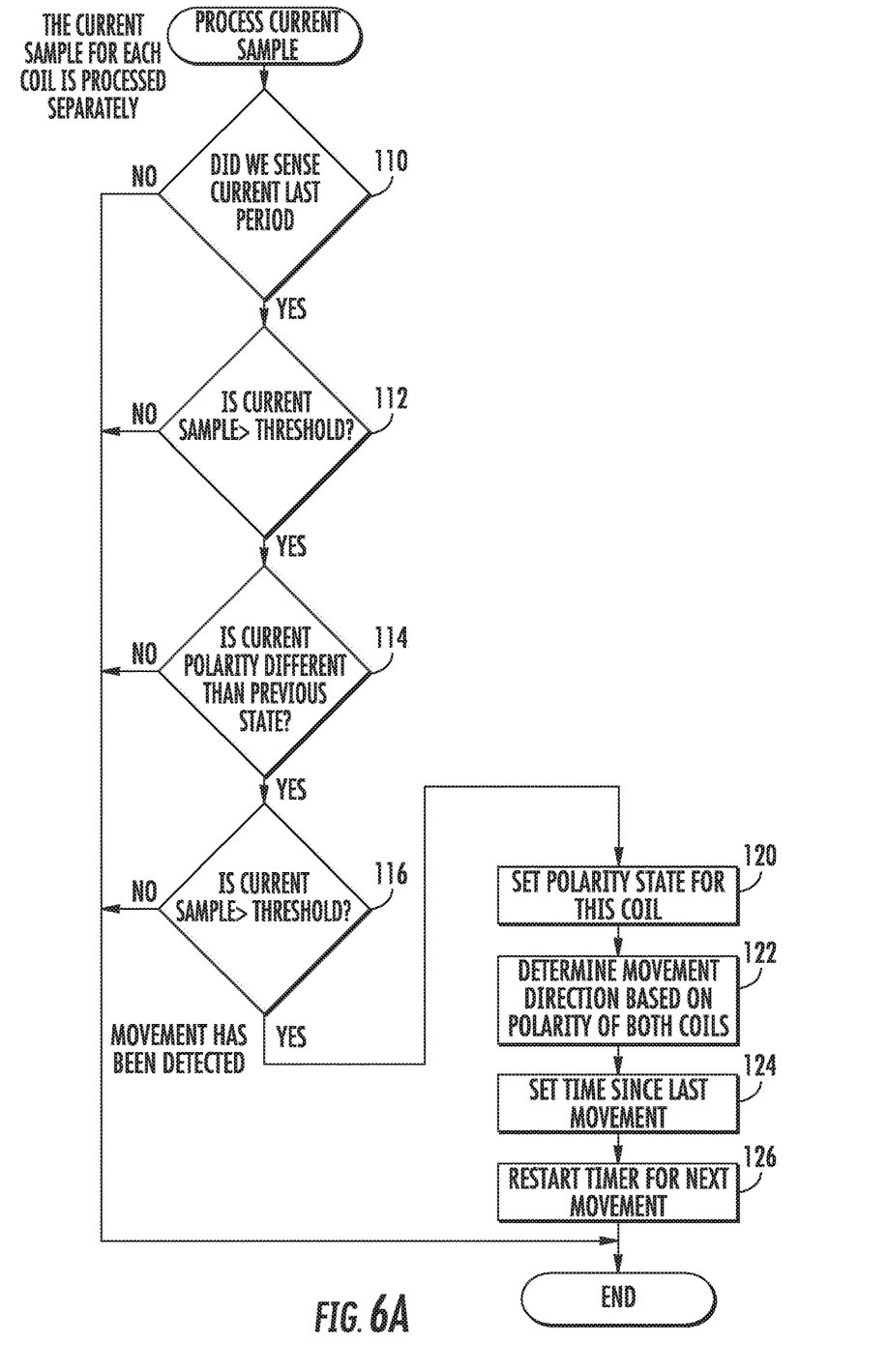
Figure 6B:
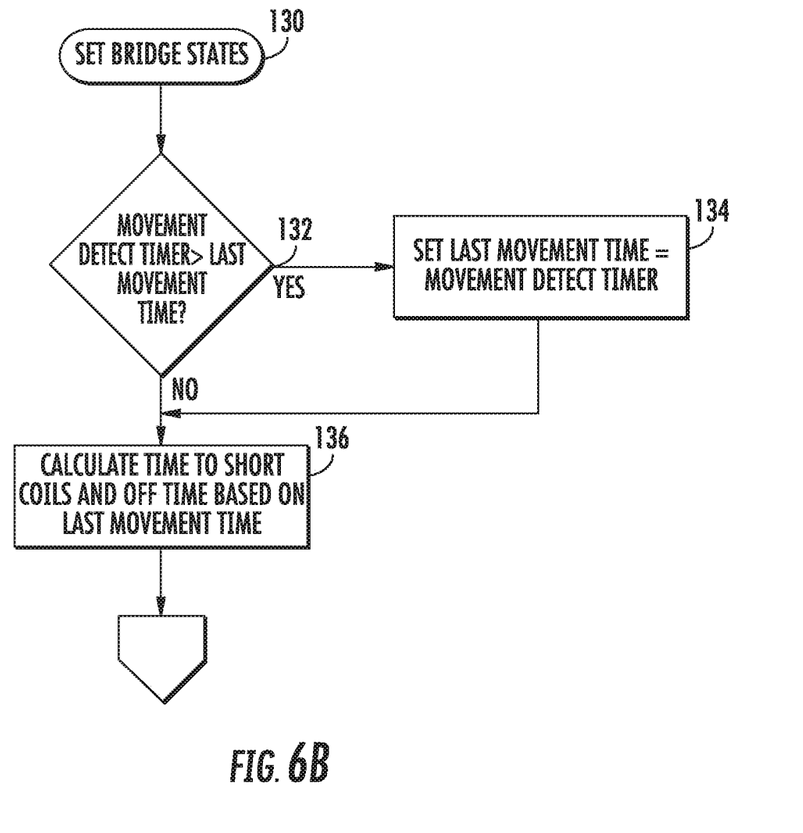

With reference to FIG. 6, in one embodiment, a method 100 of detecting movement of a grill platen while the motor is off is schematically illustrated. Initially, the method is initiated by processing the current samples to determine coil polarity and if motion has occurred (step 102; FIG. 6A), then the bridge state for the next period is (step 104; FIG. 6B).

More specifically, the current sample for each coil is processed separately. Processing is initiated by determining the current state, e.g., was current sensed last period (step 110); is the current sample greater than the previous peak (step 112); is current polarity different than previous state (step 114) and is current sample greater than threshold (step 116).

Next, once movement has been detected, the polarity state for this coil is set (step 120). Next, the movement direction is determined based on polarity of both coils (step 122). Time is then set since last movement (step 124). Finally, the timer is restarted for the next detected movement (step 126).

Next, the bridge states are set for the next period (step 130) via movement detection timer being greater than the last movement time (step 132). If movement has not been detected by the time last movement was detected then the time is extended to short the coil for longer period to increase sensitivity.

The last movement time is set equal to movement detect timer (step 134). Finally, time to short the coils is calculated and off time is based on last movement time (step 136).

This method facilitates smoother closing of the second platen assembly if the operator manually moves the platen, detection of a failed latch solenoid, and automated measurement of the over travel adjustment between latch switch and latch solenoid without changes to hardware or additional product cost.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

It should be appreciated that relative positional terms such as "forward," "aft," "upper," "lower," "above," "below," "bottom", "top", and the like are with reference to the normal operational attitude and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A grill, comprising:
    a first platen assembly;
    a second platen assembly movable with respect to the first platen assembly;
    a motor operable to move the second platen assembly with respect to the first platen assembly, wherein the motor is a two phase motor with first and second coils; and
    a control comprises a processor and a memory operable to measure movement of the second platen assembly with respect to the first platen assembly while one or both of the first and second motor coils of the motor is shorted,
    wherein the control is operable to intermittently short one or both of the first and second motor coils of the motor so that back electromotive force (EMF) generated by motor movement due to mechanical movement of the second platen assembly causes current to flow in the respective shorted motor coil, wherein the first coil is driven through a first full bridge rectifier circuit (Q1-Q4) and the second coil is driven through a second full bridge rectifier circuit (Q5-Q8T), wherein the first and second coils are connected in series with a respective first or second resistor via the respective first or second full bridge rectifier circuit,
    wherein the first motor coil is shorted by turning on transistors Q2 and Q4 and the second motor coil is shorted by turning on transistors Q6 and Q8 and the control is configured to measure the resulting current generated by the respective first and second shorted motor coils across the respective first or second resistor.

2. The grill as recited in claim 1, further comprising a latch mechanism configured to selectively couple the second platen assembly with respect to the first platen assembly.

3. The grill as recited in claim 2, further comprising a spring mechanism operable to bias the second platen assembly toward the open position.

4. The grill as recited in claim 1, wherein the control is operable to measure the current to identify a relative relatively position of the upper platen assembly.

5. The grill as recited in claim 2, wherein the control is operable to measure the current to identify a failure of the latch mechanism to couple the second platen assembly with respect to the first platen assembly due to mechanical movement of the second platen assembly.

6. The grill as recited in claim 1, wherein the control is operable to measure the current to identify an over travel adjustment.

7. The grill as recited in claim 1, wherein the control is operable to measure the current to identify a position of the upper platen assembly.

8. The grill as recited in claim 1, wherein only one of the first and second coils is shorted at a time.

\* \* \* \* \*

UNITED STATES PATENT AND TRADEMARK OFFICE
CERTIFICATE OF CORRECTION

PATENT NO. : 11,051,653 B2  
APPLICATION NO. : 16/082800  
DATED : July 6, 2021  
INVENTOR(S) : Daniel L. Kelly

Page 1 of 1

It is certified that error appears in the above-identified patent and that said Letters Patent is hereby corrected as shown below:

In the Claims

In Column 6, Line 44, Claim 1 should read as follows:
--bridge rectifier circuit (Q5-Q8), wherein the first and--

Signed and Sealed this  
Eighth Day of July, 2025

Coke Morgan Stewart  
*Acting Director of the United States Patent and Trademark Office*